United States Patent
Ishikawa et al.

(10) Patent No.: US 8,141,902 B2
(45) Date of Patent: Mar. 27, 2012

(54) AIRBAG DEVICE

(75) Inventors: Toshihiro Ishikawa, Aki-gun (JP); Naoki Yamaji, Settsu (JP); Tomoki Hashizume, Settsu (JP); Kazuhiko Soemoto, Settsu (JP); Keisuke Moritani, Settsu (JP)

(73) Assignees: Mazda Motor Corporation, Hiroshima (JP); Ashimori Industry Co., Ltd, Osaka (JP)

( * ) Notice: Subject to any disclaimer, the term of this patent is extended or adjusted under 35 U.S.C. 154(b) by 0 days.

(21) Appl. No.: 13/177,069

(22) Filed: Jul. 6, 2011

(65) Prior Publication Data

US 2011/0259662 A1 Oct. 27, 2011

Related U.S. Application Data

(62) Division of application No. 12/280,762, filed as application No. PCT/JP2007/053531 on Feb. 26, 2007.

(30) Foreign Application Priority Data

| Feb. 27, 2006 | (JP) | 2006-051313 |
| Feb. 27, 2006 | (JP) | 2006-051329 |
| Aug. 10, 2006 | (JP) | 2006-218768 |
| Aug. 10, 2006 | (JP) | 2006-218769 |

(51) Int. Cl.
*B60R 21/276* (2006.01)
(52) U.S. Cl. ........ 280/739; 280/743.1; 112/285
(58) Field of Classification Search .......... 280/739, 280/743.1, 743.2; 112/285, 157
See application file for complete search history.

(56) References Cited

U.S. PATENT DOCUMENTS

| 3,990,726 | A | * | 11/1976 | Oka et al. ............. 280/739 |
| 5,016,913 | A | * | 5/1991 | Nakajima et al. ..... 280/738 |
| 5,362,101 | A | * | 11/1994 | Sugiura et al. ........ 280/743.2 |
| 5,380,038 | A | * | 1/1995 | Hawthorn et al. ..... 280/730.1 |
| 5,685,562 | A | * | 11/1997 | Jordan et al. ......... 280/739 |
| 6,290,257 | B1 | * | 9/2001 | Bunce et al. ......... 280/739 |
| 6,923,286 | B2 | * | 8/2005 | Sato et al. ........... 180/274 |
| 6,988,578 | B2 | * | 1/2006 | Kikuchi et al. ....... 180/274 |
| 7,152,875 | B2 | * | 12/2006 | Kai ................... 280/739 |
| 7,152,878 | B2 | * | 12/2006 | Kai ................... 280/743.2 |

(Continued)

FOREIGN PATENT DOCUMENTS

GB 2302845 A 2/1997

(Continued)

OTHER PUBLICATIONS

Supplementary European Search Report dated Oct. 1, 2009 in corresponding European Patent Application No. 07 73 7383.

*Primary Examiner* — Drew Brown
(74) *Attorney, Agent, or Firm* — Sughrue Mion, PLLC

(57) ABSTRACT

An airbag (10) has a vent hole (18) in one side end portion. One end of a third base fabric (20) is sewn to the airbag (10) through a first sewn portion (23) that closes the vent hole (18), and the other end of the third base fabric 20 is sewn to the other side end portion of the airbag (10) through a second sewn portion (24). The first sewn portion (23) has weaker binding force by sewing than the second sewn portion (24) so that the first sewn portion (23) is separated to open the vent hole (18) when tension force is applied from the third base fabric (20) to the first and second sewn portions (23) and (24).

7 Claims, 12 Drawing Sheets

U.S. PATENT DOCUMENTS

| | | | |
|---|---|---|---|
| 7,458,607 B2 * | 12/2008 | Abe | 280/739 |
| 7,497,467 B2 * | 3/2009 | Chida et al. | 280/739 |
| 7,543,849 B2 * | 6/2009 | Bradburn | 280/739 |
| 7,607,690 B2 * | 10/2009 | Abe et al. | 280/739 |
| 2001/0035639 A1 | 11/2001 | Amamori | |
| 2004/0207186 A1 | 10/2004 | Kai | |
| 2005/0098991 A1 | 5/2005 | Nagai et al. | |
| 2007/0170710 A1 * | 7/2007 | Bouquier | 280/739 |

FOREIGN PATENT DOCUMENTS

| | | |
|---|---|---|
| JP | 07-205738 A | 8/1995 |
| JP | 2000-043672 A | 2/2000 |
| JP | 2001-322518 A | 11/2001 |
| JP | 2004-017776 A | 1/2004 |
| JP | 2004-314739 A | 11/2004 |
| JP | 2005-193881 A | 7/2005 |

* cited by examiner

AIRBAG DEVICE

CROSS-REFERENCE TO RELATED APPLICATIONS

This application is a Divisional Application of U.S. application Ser. No. 12/280,762 filed Jan. 9, 2009 which is a National Stage Application under 35 U.S.C. §371 of PCT/JP2007/053531 filed Feb. 26, 2007, wherein the entire disclosure of the prior applications are hereby incorporated by reference in their entirety.

TECHNICAL FIELD

The present invention relates to an airbag device, and more specifically, to an airbag device installed in a vehicle for reducing impact exerted on a person to be protected, whose motion is difficult to be determined, during collision with the vehicle.

BACKGROUND ART

When, for example, a running vehicle collides with a pedestrian or the like, the pedestrian or the like is thrown onto the bonnet by the impact of the collision. The pedestrian or the like is then subjected to a secondary collision, such as going into the vehicle by breaking the windshield of the vehicle or colliding with a front pillar or the like, and may cause a disaster.

Various pedestrian airbag devices for absorbing and reducing the impact of such a secondary collision have been developed. It is necessary for pedestrian airbags to maintain inflation of the airbags for relatively long period of time, until objects to be protected by the airbags (pedestrians) push into the airbags.

Typically, when a vehicle collides with a pedestrian, a pedestrian airbag device supplies gas generated by an inflator upon the impact into the airbag to inflate and deploy the airbag. In this state, the pedestrian airbag device receives the pedestrian thrown thereon to reduce the impact, and prevents a secondary collision from occurring.

However, if a person thrown into the air collides with an inflated airbag, the person may be seriously injured by the impact. In particular, because a person collided with a car and thrown into the air usually goes into the driver's seat side from the head, if the person pushes into the airbag during inflation, the person may receive serious injury to the head due to the resilience.

An airbag having a gas releasing hole (or a vent hole through which gas is discharged) in a portion thereof for reducing excess pressure to reduce the impact exerted on a pedestrian during pushing into the airbag in an inflated and deployed state is known (refer to Patent Document 1).

However, an airbag which simply has a vent hole allows gas to be released before absorbing impact and fails to maintain inflation of the airbag. Thus, appropriate impact-absorbing characteristics may not be obtained in the initial stage.

[Patent Document 1] Japanese Unexamined Patent Application Publication No. 2001-322518

DISCLOSURE OF INVENTION

Problems to be Solved by Invention

The present invention has been made to solve the above-described problem of airbag devices. Objects of the present invention are to improve the safety of airbag devices and to reduce the impact exerted on a pedestrian or the like during a secondary collision, by not releasing gas until the pedestrian or the like thrown onto the bonnet collides with the airbag, but by releasing gas at the timing of the pedestrian or the like colliding with the airbag. Another object of the present invention is to provide such airbag devices at a low cost by simplifying the structure of the airbag devices.

Means for Solving the Problems

According to a first aspect of the invention, an airbag device includes an airbag inflatable with gas generated by an inflator, the airbag having a front surface base fabric and a back surface base fabric. The airbag has a first vent hole through which gas is discharged. The airbag further has a third base fabric that covers a surface of the airbag and restricts inflation of the airbag during inflation, both sides of the third base fabric being sewn by a thread to the front and back surface base fabrics of the airbag. The first vent hole is closed by one sewn portion between the sewn portions. While the airbag is in an inflated state, the thread of the one sewn portion of the third base fabric is broken and the first vent hole is opened, by the further inflation of the airbag resulting from pushing into the third base fabric by a person.

According to a second aspect of the invention, in the airbag device according to the first aspect, at least one end of the sewn portions of the third base fabric is provided near a boundary between a portion where inflation is restricted by the third base fabric of the airbag when a person pushes into the third base fabric of the airbag in an inflated state, and a portion adjacent thereto where inflation is not restricted.

According to a third aspect of the invention, in the airbag device according to the first or second aspect, the airbag further has a second vent hole through which gas is discharged, the second vent hole being provided at a certain distance from the first vent hole. The second vent hole is closed by the other sewn portion between the sewn portions of the third base fabric.

According to a fourth aspect of the invention, in the airbag device according to any one of the first to third aspects, the other sewn portion has a greater binding force by sewing than the one sewn portion between the sewn portions of the third base fabric.

According to a fifth aspect of the invention, in the airbag device according to any one of the first to fourth aspects, each of the sewn portions includes a first sewn portion where an opening portion of the vent hole is sewn in a straight line, and a second sewn portion connected to the first sewn portion, where a portion adjoining the second opening portion of the vent hole is sewn by a thread in a zigzag line. Breaking forces of the thread of the sewn portions are differentiated by changing the length of the second sewn portions.

According to a sixth aspect of the invention, an airbag device includes an airbag inflatable with gas generated by an inflator, the airbag having a front surface base fabric and a back surface base fabric. The front surface base fabric of the airbag has a vent hole through which gas is discharged. The airbag further has a third base fabric that restricts inflation of the airbag during inflation, the third base fabric covering the vent hole, both sides of the third base fabric being joined to the front surface base fabric. While the airbag is in an inflated state, the third base fabric is broken and the first vent hole is opened, by the further inflation of the airbag resulting from pushing into the third base fabric by a person.

According to a seventh aspect of the invention, in the airbag device according to the sixth aspect, at least one of cut ends of the third base fabric is provided near a boundary between a portion where inflation is restricted by the third base fabric of the airbag when a person pushes into the third base fabric of the airbag in an inflated state, and a portion adjacent thereto where inflation is not restricted.

According to an eighth aspect of the invention, in the airbag device according to the sixth or seventh aspect, the third base fabric has a cutting line near the vent hole. The third base fabric is cut along the cutting line and the vent hole is opened when a person pushes into the third base fabric of the airbag while the airbag is in an inflated state.

According to a ninth aspect of the invention, in the airbag device according to the eighth aspect, the cutting line includes intermittent cuts.

According to a tenth aspect of the invention, an airbag device includes an airbag inflatable with gas generated by an inflator, the airbag having a front surface base fabric and a back surface base fabric. The front surface base fabric of the airbag has a vent hole through which gas is discharged. The airbag further has a third base fabric that restricts inflation of the airbag during inflation, the third base fabric covering the vent hole, both sides of the third base fabric being joined to the front surface base fabric. While the airbag is in an inflated state, a joined portion at the joined side portions of the third base fabric is separated and the vent hole is opened, by the further inflation of the airbag resulting from pushing into the third base fabric by a person.

According to an eleventh aspect of the invention, in the airbag device according to the tenth aspect, at least one end of the joined side portions of the third base fabric is provided near a boundary between a portion where inflation is restricted by the third base fabric of the airbag when a person pushes into the third base fabric of the airbag in an inflated state, and a portion adjacent thereto where inflation is not restricted.

According to a twelfth aspect of the invention, in the airbag device according to any one of the sixth to eleventh aspects, the front surface base fabric further has a second vent hole provided at a certain distance from the vent hole, the second vent hole being closed by the third base fabric during inflation of the airbag.

According to a thirteenth aspect of the invention, in the airbag device according to any one of the first to twelfth aspects, the airbag has a plurality of lines of internal tethers that restrict inflation of the airbag to create a space between the front surface and the third base fabric during inflation of the airbag.

According to a fourteenth aspect of the invention, in the airbag device according to any one of the first to thirteenth aspects, the inside of the airbag is sectioned by a plurality of lines of internal tethers.

According to a fifteenth aspect of the invention, in
the airbag device according to any one of the first to fourteenth aspects, the third base fabric has such a length that it is not affected by tension caused by inflation of the airbag during inflation of the airbag.

According to a sixteenth aspect of the invention, in the airbag device according to any one of the first to fifteenth aspects, a fourth base fabric that restricts inflation of the back surface of the airbag in a transverse direction during inflation of the airbag is provided on the back surface base fabric of the airbag.

According to a seventeenth aspect of the invention, in the airbag device according to any one of the first to sixteenth aspects, the airbag device deploys from an opening along a rear end of a bonnet of a vehicle.

Effect

The airbag device of the present invention timely releases gas in the airbag and reduces the impact load by utilizing the impact of a person pushing into an airbag to open a vent hole through which gas is discharged.

Advantages of the Invention

According to the present invention, when a person pushes into an inflating airbag, the resilience is timely reduced. Thus, the impact exerted on the person is reduced, and the airbag can safely receive the person. Further, the airbag devices can be produced at low cost by simplifying the structure.

DESCRIPTION OF REFERENCE NUMERALS

1: airbag device, 2: vehicle, 3: bonnet, 3a: rear edge portion, 5: windshield, 10: airbag, 11: inflator, 12: airbag body, 13: internal tether, 18: vent hole, 18A: vent hole, 18B: vent hole, 18C: vent hole, 18D: vent hole, 20: third base fabric, 20B: end of third base fabric, 21: fourth base fabric, 23, 60: first sewn portion, 24, 61: second sewn portion, 23a, 24a:

straight-line sewn portion, 23b, 24b: zigzag-line sewn portion, 25: cutting line, and 29: cowl panel.

BEST MODES FOR CARRYING OUT THE INVENTION

An airbag device according to an embodiment of the present invention will now be described with reference to the drawings.

Figure 1:
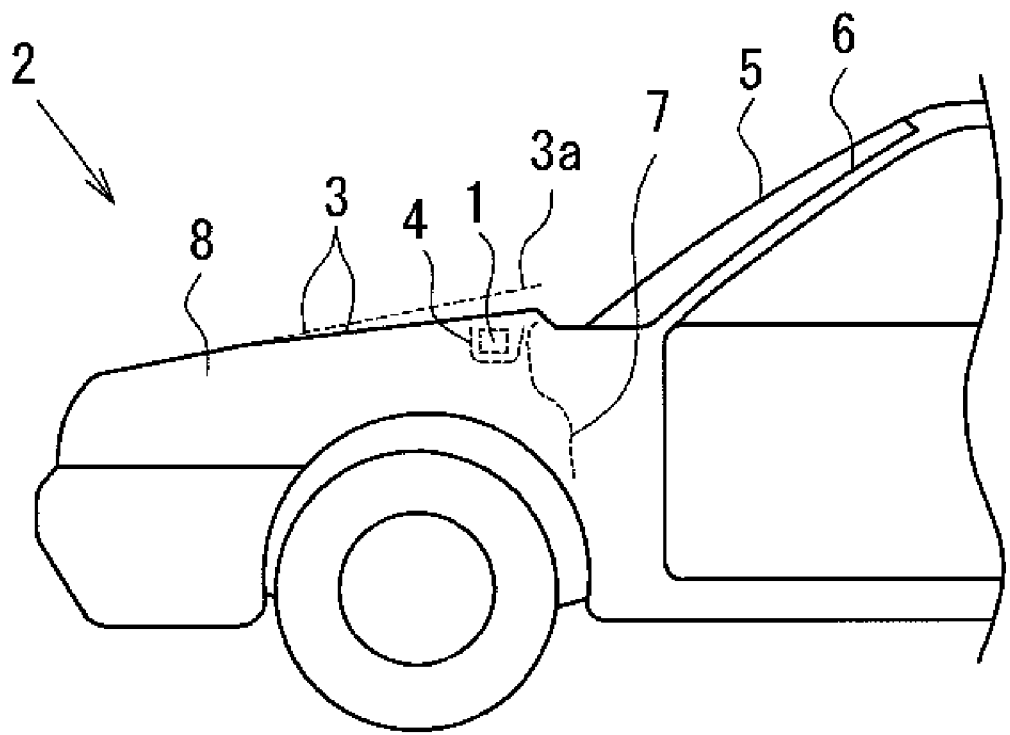
FIG. 1 is a side view of a relevant part of a vehicle equipped with an airbag device of the present invention.

FIG. 1 is a side view of a relevant part of a vehicle equipped with an airbag device according to the present embodiment. The airbag device 1 according to the present embodiment is stored in a folded state inside a rear portion 3a of a bonnet 3 of a vehicle 2, using a supporting mechanism 4. The rear portion 3a of the bonnet 3 is configured to be opened and closed up and down, and is normally retained by a known retaining mechanism at a lower position. In the figure, 5 denotes a windshield glass, 6 denotes a front pillar, 7 denotes a dash panel, and 8 denotes a fender panel.

Figure 2:
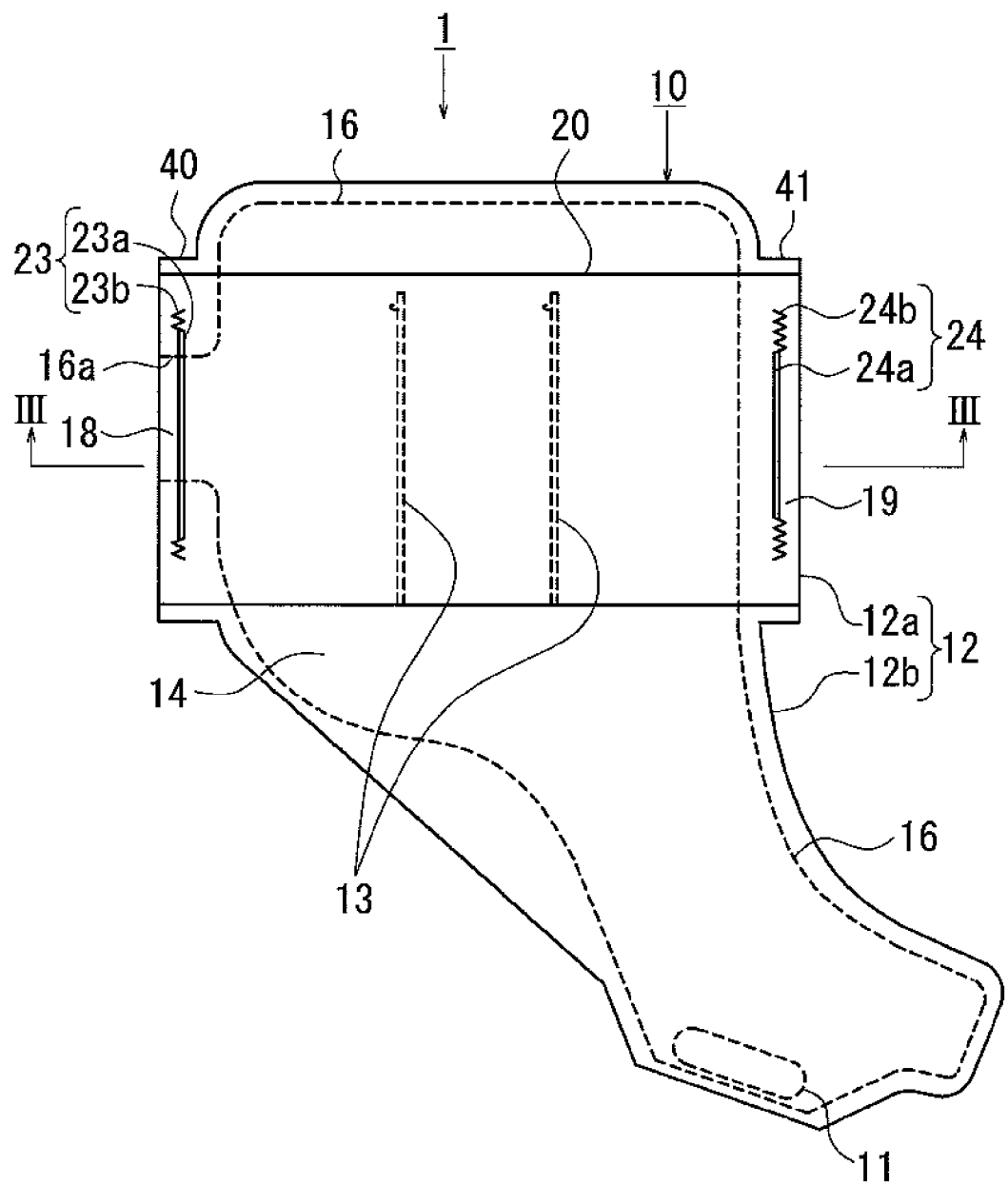
FIG. 2 is a front view of an airbag device according to a first embodiment of the present invention.
Figure 3:
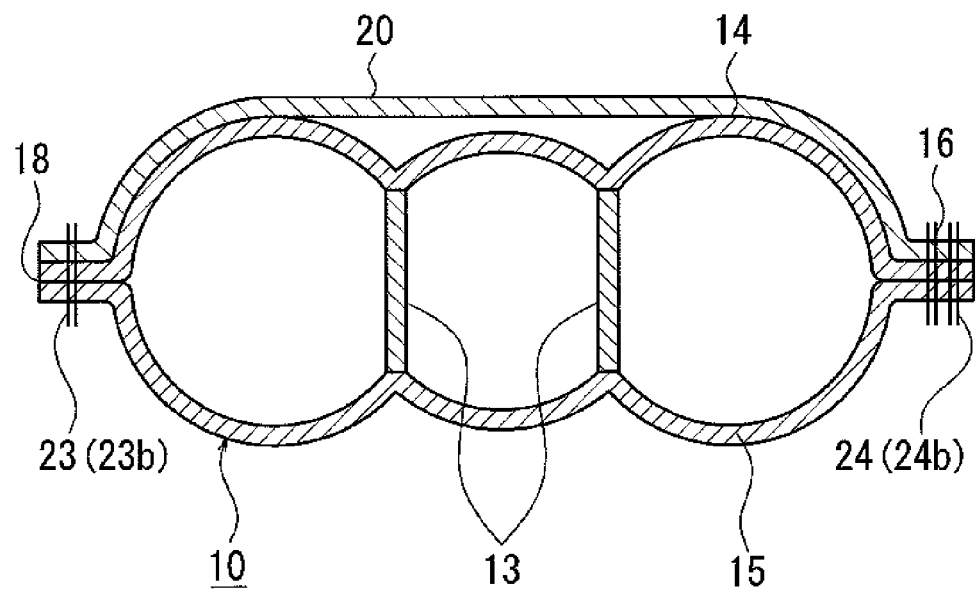
FIG. 3 is a sectional view taken along line III-III in FIG. 2.

FIG. 2 is a front view of the airbag device 1 in a deployed state, and FIG. 3 is a sectional view taken along line III-III in FIG. 2.

The airbag device 1 has an airbag 10 and an inflator 11 that discharges gas into the airbag 10 to inflate the airbag 10 during collision. The airbag 10 has a bag-like airbag body 12 and internal tethers 13 that restrict inflation, provided in the airbag body 12.

The airbag body 12 includes a pillar portion 12a, which is a wide, substantially rectangular bag shown in the upper part of the figure, and a base portion 12b, which is a narrow tubular bag shown in the lower part. The airbag body 12 is formed in the shape of a bag by sewing a front surface (or front side) base fabric 14, with which a pedestrian collides, and a back surface base fabric 15 having the same shape as the base fabric 14 together at a sewn portion 16 along the outer peripheral portion, shown by the dashed line in FIG. 2.

The front surface base fabric 14 and the back surface base fabric 15 may be made of cloth typically employed in airbags, synthetic resin fabric, or the like.

The sewn portion 16 has an unsewn portion between sewn portions 16a that extend to an outer end, at the left end of the pillar portion 12a in FIG. 2. The unsewn portion constitutes a below-described vent hole 18.

A rectangular third base fabric (also referred to as a "front surface tether") 20 that is narrower in width in the longitudinal direction (in the figure, the top-bottom direction) than the rectangular pillar portion 12a in a deployed state and has substantially the same length in the transverse direction (in the figure, the left-right direction) is provided on the surface of the front surface base fabric 14 of the airbag 10. The third base fabric 20 is made of an unstretchable fabric and has a smaller length in the transverse direction than the pillar portion 12a. The third base fabric 20 is sewn to the front and back surface base fabrics 14 and 15 at one end in the width direction thereof, by a first sewn portion 23 at the portion of the vent hole 18, and at the other end by a second sewn portion 24 at an end 19 opposite to the vent hole 18 in the width direction.

The third base fabric 20 and the airbag 10 are sewn together in an airtight manner, by filling the sewn portion with silicon or adhesive resin, or gluing the third base fabric 20 and the airbag 10 and thereafter sewing together.

Herein, the internal tethers 13 have such a length that they restrict the thickness of the airbag 10 during inflation in such a manner that a certain space is created between the front surface of the airbag and the third base fabric 20 during inflation. Further, the third base fabric 20 is set to have such a length that tension (tensile force) due to inflation acts thereon during inflation of the airbag 10. The third base fabric 20 is arranged on the front surface of the airbag 10 while being sewn to the front and back surface base fabrics 14 and 15, as described below.

Herein, the third base fabric 20 is sewn to the front and back surface base fabrics 14 and 15 at both side ends, by the first and second sewn portions 23 and 24. The first sewn portion 23 includes a straight-line sewn portion 23a and zigzag sewn portions 23b located at both sides of the straight-line sewn portion 23a. The second sewn portion 24 includes a straight-line sewn portions 24a and zigzag sewn portions 24b located at both sides of the straight-line sewn portion 24a. The straight-line sewn portion 23a is provided to enable the vent hole 18 to be quickly opened when a thread is cut, and is provided at an opening portion of the vent hole 18. Further, the length of the zigzag sewn portions 23b of the first sewn portion 23 are shorter than the zigzag sewn portions 24b of the second sewn portion, whereby the first sewn portion 23 have a weaker binding force by sewing than the second sewn portion 24.

When, for example, the head of a person hits the third base fabric 20 of the airbag 10 and pushes the airbag 10 during inflation of the airbag 10, the internal pressure of the airbag 10 is increased. Great tension caused by the increased internal pressure and the inflating airbag 10 is exerted on the sewn portions 23 and 24 of the third base fabric 20. The above-described structure allows only the first sewn portion 23 to be cut and the third base fabric 20 to be separated. Simultaneously, the sewn portion between the front and back surface base fabrics 14 and 15 are separated and the vent hole 18 is certainly provided.

The length of the internal tethers 13 (refer to FIG. 3) in the airbag 10 are, as shown in FIG. 2, substantially slightly smaller than the length of the third base fabric 20 in the longitudinal direction, and are longitudinally attached at two portions in the figure, namely, left and right, of the pillar portion 12a. As described above, the internal tethers 13 create a space between the front surface base fabric 14 of the airbag 10 and the third base fabric 20 during inflation of the airbag 10. The internal tethers 13 also serve to prevent the gas filled in the spaces between the tethers 13 from being released instantly through the vent hole 18 when the vent hole 18 through which gas is discharged is opened, and prevent the gas pressure from being rapidly dropped.

The inflator 11 for generating gas when a vehicle is subjected to an impact is attached to the inside of the airbag body 12, at a lower end position of the base portion 12b in FIG. 2.

Next, operation of the airbag device 1 according to the present embodiment will be described.

When a running vehicle collides with a pedestrian, a pedestrian-collision detection sensor (not shown) detects the collision. If the detected impact is larger than a predetermined value, an activation signal is output to the inflator 11 of the airbag device 1. The inflator 11, upon receipt of the activation signal, generates gas. The airbag 10 is inflated with the gas.

Figure 4:
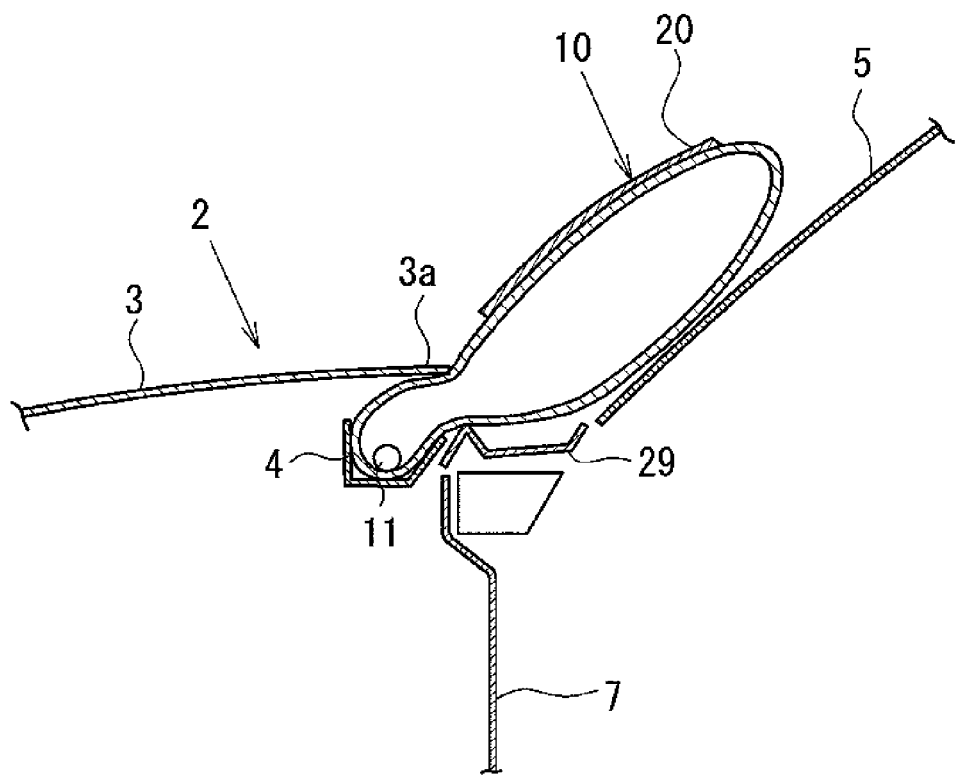
FIG. 4 is a side sectional view of the airbag of the present invention during inflation and deployment.

As the airbag 10 inflates, the rear portion of the bonnet 3a is pushed up. Then, as shown in the sectional view of FIG. 4, the airbag 10 stands up in the direction of the windshield 5, from the opening between the rear edge portion 3a of the bonnet 3 and the cowl panel 29 of the car body, and is deployed.

The person collided with the vehicle 2 and thrown onto the bonnet 3 pushes into, usually from the head, the pillar portion 12a of the airbag 10 inflated and deployed in front of the windshield 5 or the front pillar 6.

Figure 5:
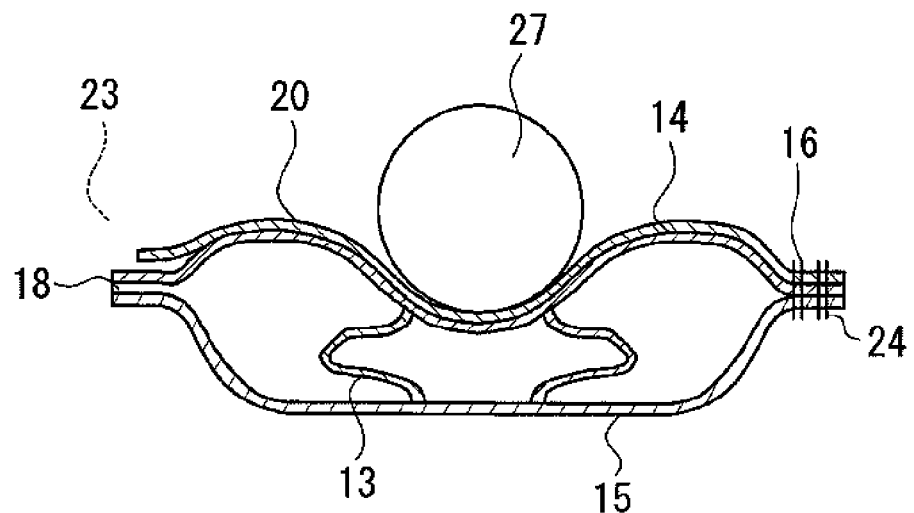
FIG. 5 is a sectional view of the airbag collided with a human body.

More specifically, when a head 27 of the person collides with the pillar portion 12a of the airbag 10 through the third base fabric 20, the portion of the airbag 10 hit by the head 27 is pushed as shown in FIG. 5, and the internal pressure is increased. The inflating airbag 10 is deformed because the length of the third base fabric 20 is shorter than the length of the front surface base fabric 14 of the airbag 10. Great tension caused by the restoration of the deformed airbag 10 being restored is exerted on the first sewn portion 23 and the second sewn portion 24 at both ends of the third base fabric 20.

In the present embodiment, binding force by sewing of the first sewn portion 23 on the vent hole 18 side is set weaker than that of the second sewn portion 24. Thus, the thread of the first sewn portion 23 is certainly cut. This allows the thread sewed the vent hole 18 to be removed and the vent hole 18 to be opened, through which the gas is released. Thus, excessive pressure generated by the pushing of the head 27 is rapidly reduced, whereby the airbag 10 can safely receive the head 27 at the front surface thereof, while absorbing the impact.

In the airbag device 1 according to the first embodiment, the length of the third base fabric 20 is set shorter than the length of the front surface base fabric 14 so that tension is applied to the sewn portions 23 and 24 between the third base fabric 20 and the airbag 10, during inflation and deployment of the airbag 10. When a person hits the third base fabric 20 during collision, the internal pressure of the airbag 10 increases. This increases tension to be applied to the third base fabric 20, whereby the sewn portion 23 of the third base fabric 20 can easily and assuredly be cut.

In this structure, the cutting strength of the sewn portion 23 needs to be set in such a manner that the sewn portion 23 is not cut during high-pressure deployment of the airbag 10, but is cut, even in a low-pressure state, when a person (dummy) pushed into the airbag 10. However, providing such a sewing structure is not always easy. Further, because tension is applied to the third base fabric 20 during inflation of the airbag 10, this structure lacks the robustness (adaptability to change in tension due to change in temperature). In order for the third base fabric 20 to satisfy the performance required by the airbag device 1 even if the tension varies, the setting range of the breaking load of the third base fabric 20 inevitably becomes narrow.

Figure 6:
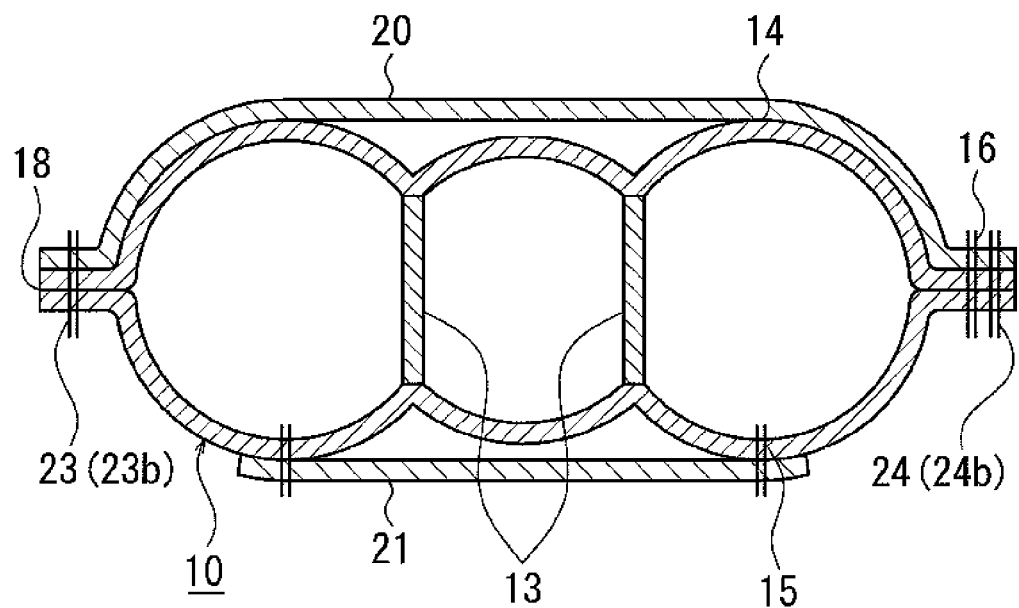
FIG. 6 is a sectional view of an airbag device having a third base fabric, according to a second embodiment.

An airbag device according to a second embodiment, the section of which is shown in FIG. 6, solves this problem by increasing the length of the third base fabric 20 compared to that according to the first embodiment, so that tension caused by inflation of the airbag is not applied to the third base fabric 20.

More specifically, it is structured that tension is not applied to the third base fabric 20 when the airbag 10 is inflated. Further, the belt length of the internal tethers 13 that restrict the thickness of the airbag 10 is reduced compared to the belt length of the internal tethers 13 according to the first embodiment, so that the airbag 10 has larger concavities and convexities (the space between the third base fabric 20 and the airbag 10). In this case too, the length of the front surface base fabric of the airbag 10 is longer than the length of the third base fabric 20. When a person (dummy) pushes into the third base fabric 20, tension is applied to the sewn portion 23. When the tension reaches a predetermined value, the first sewn portion 23 of the third base fabric 20 is broken and the vent hole 18 is opened.

In addition, a fourth base fabric (also referred to as a back surface tether) 21 is provided on the back surface of the airbag 10 in such a manner that it extends along the surface thereof. Both ends of the fourth base fabric 21 are sewed to or adhered to proper positions including both ends of the back surface base fabric 15 of the airbag 10. This prevents the airbag 10 from being easily deformed and its back surface from opening outward (or sideward) when a person pushes into the front surface of the airbag 10, and prevents the airbag 10 from being bent in such a manner that it wraps the person pushed into the airbag 10 up.

Of course, the fourth base fabric 21 may be provided on the back surface of the airbag 10 according to the first embodiment.

In the present embodiment, the base fabric 20 is not under tension until a person (dummy) pushes into the third base fabric 20, and thus, is not affected by the internal pressure of the airbag 10. Accordingly, the base fabric 20 has good robustness to temperature. (The amount of gas ejected varies according to the temperature, and the strength of the sewn portions 23 and 24 of the third base fabric 20 varies according to the temperature if the sewn portions 23 and 24 are made of resin. However, because the third base fabric 20 is not under tension, it is not affected by the temperature.)

Further, the sewn portions 23 and 24 of the third base fabric 20 may have low sewing strength because they are not affected by the internal pressure of the airbag 10. Thus, influence of variation of strength due to sewing can be minimized.

In addition, the difference in the length of the third base fabric 20 and the base fabric of the front surface of the airbag 10 creates a space between the third base fabric 20 and the base fabric of the front surface of the airbag 10. This further increases tension applied to the third base fabric 20 during pushing of a person (dummy), and allows the sewn portion 23 to be broken in a stable state.

Figure 7:
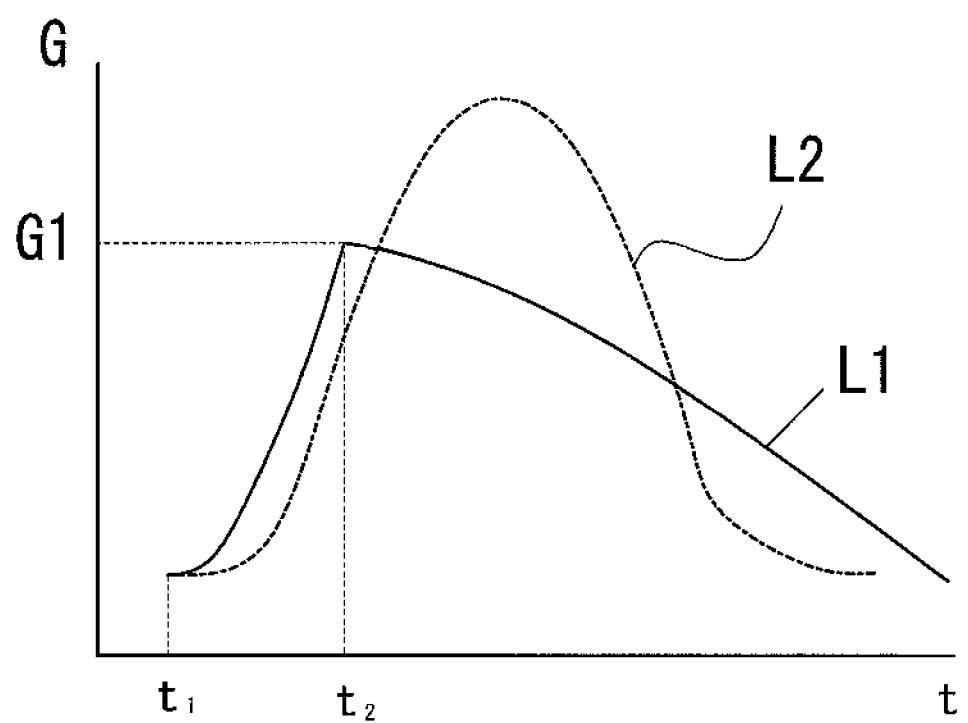
FIG. 7 is a chart showing temporal changes in acceleration acting on a collided object during collision, with respect to an airbag device of the present invention and a known airbag device.

FIG. 7 is a chart showing change in acceleration G acting on a person (in this case, the head of a dummy) with respect to time t, when a collision load is applied to the airbag 10. In FIG. 7, the solid line L1 shows a change with respect to the airbag device 1 of the present invention, and the dot and dash line L2 shows a change with respect to a known airbag device with no vent hole.

As shown in FIG. 7, in the case of an airbag device without a vent hole, when hit by the head at time t1, the airbag 10 is pushed, and the pressure of the airbag 10 rapidly increases because of the deformation. Thus, the acceleration G acting on the head rapidly increases.

In contrast, in the case of the airbag device 1 according to the present embodiment, when the head pushes into the third base fabric 20 at time $t_2$, the first sewn portion 23 of the third base fabric 20 is cut, and the vent hole 18 is opened. When the vent hole 18 is opened, gas in the airbag 10 is released and the pressure is reduced. Accordingly, the impact exerted on the head is reduced and the human body is protected.

In the airbag devices according to the first and second embodiments, if a person pushes into the sewn portion of the vent hole 18, the thread of the first sewn portion 23 of the third base fabric 20 may not be cut, and hence, the vent hole 18 may not be opened.

So, next, an airbag device according to a third embodiment, which has a structure for solving this problem will be described. Although the structures of the third base fabric 20 of the airbag devices according to the below-described third and fourth embodiments have the attachment structure of the third base fabric 20 according to the above-described second embodiment, the description thereof will be omitted (it is of course possible to employ the attachment structure of the third base fabric 20 according to the first embodiment). The fourth base fabric 21 may also be provided if necessary.

Figure 8:
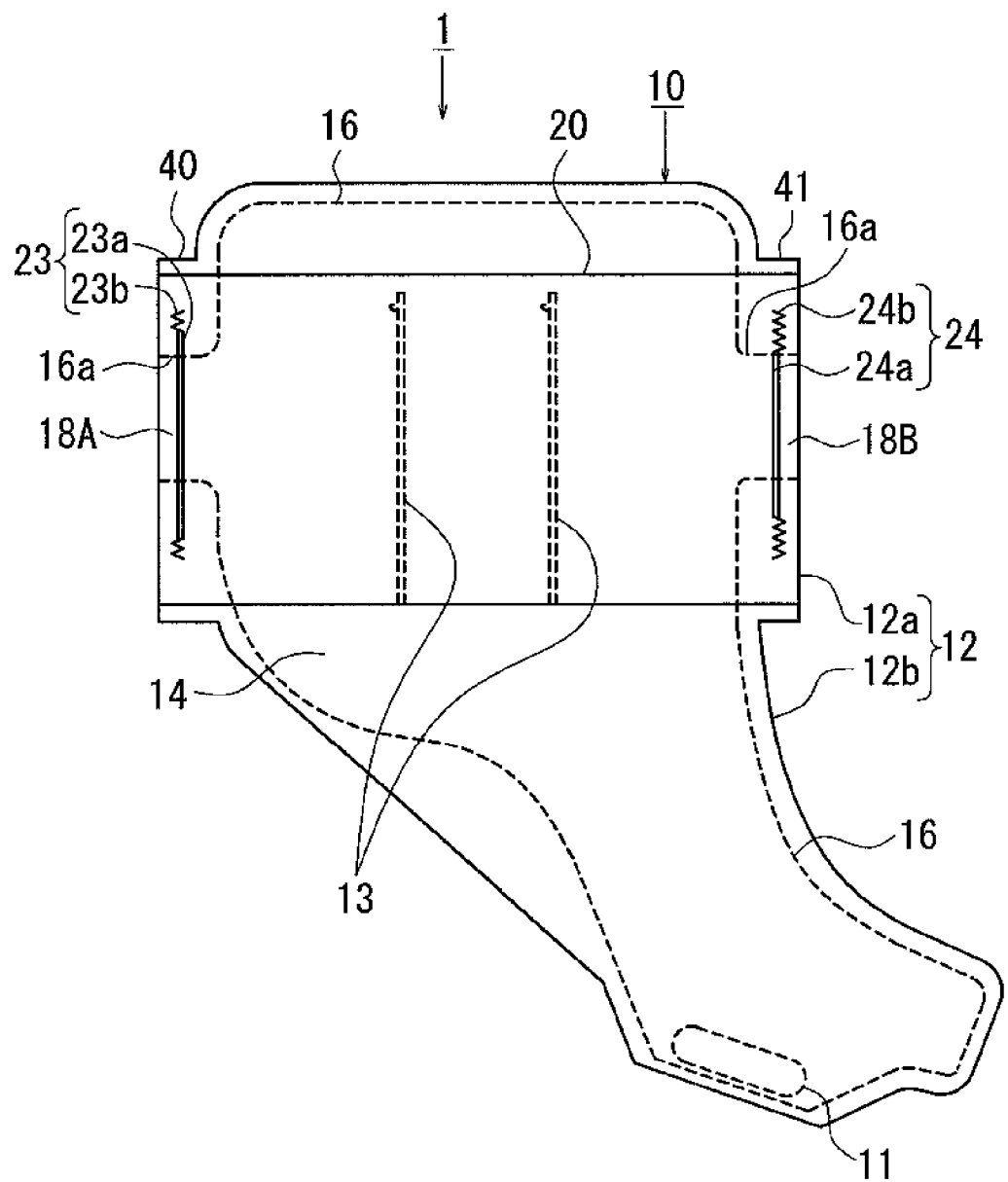
FIG. 8 is a front view of an airbag device according to a third embodiment of the present invention.

FIG. 8 is a front view of the airbag device according to the third embodiment of the present invention.

In the airbag device according to the third embodiment, the pillar portion 12a has both left and right side ends 40 and 41 in the figure, where a first vent hole 18A and a second vent hole 18B are formed. Both end edges (or both side portions) of the third base fabric 20 are sewn to the front and back surface base fabrics 14 and 15 at the portions of the first vent hole 18A and the second vent hole 18B, along the first sewn portion 23 and the second sewn portion 24. The vent holes 18A and 18B are sewn along the straight-line sewn portions 23a and 24a, respectively, and closed. Because the other structures are the same as those of the airbag device according to the first embodiment, the description thereof will be omitted.

In the present embodiment, for example, if the head of a person pushes into the sewn portion 23 where the third base fabric 20 and the vent hole 18A are sewn together, and if the head presses the first sewn portion 23 of the third base fabric 20 and prevents the sewn portion 23 from being cut, the second sewn portion 24 side of the third base fabric 20 is pulled instead. Then, the thread is cut and the second vent hole 18B is opened.

If collision occurs at another portion of the pillar portion 12a, like the first embodiment, the thread of the first sewn portion 23 having weak binding force by sewing is cut, and the first vent hole 18A is opened.

If, for example, the head of a person pushes into the portion between the internal tethers 13 of the airbag 10, that is, the central portion of the third base fabric 20, sometimes, not frequently though, both the vent holes 18A and 18B are opened. Even in such a case, the internal tethers 13 restrict rapid drop of the gas pressure. Thus, the extremely great tension of the gas filled in the space between the internal tethers 13 is not lost instantly, and bottoming does not occur. It is possible to prevent bottoming from occurring by reducing the size of the vent holes 18A and 18B.

As has been described, in the third embodiment, because one of the vent holes 18A and 18B is certainly opened wherever the person pushes into the airbag 10, the safety is further increased compared to the first and second embodiments.

Figure 9:
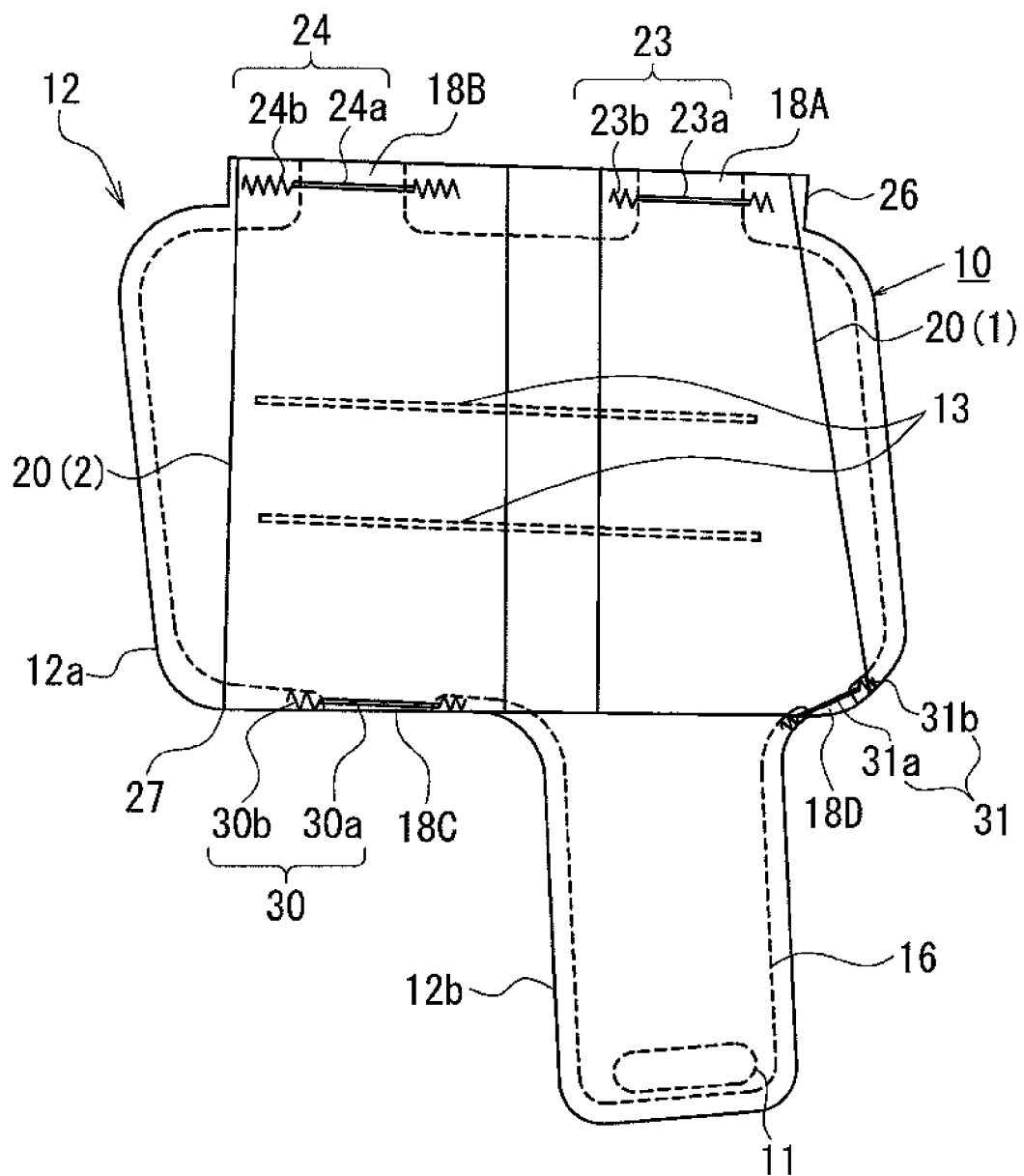
FIG. 9 is a front view of an airbag device according to a fourth embodiment of the present invention.

FIG. 9 shows an airbag device according to a fourth embodiment of the present invention.

In the fourth embodiment, there are a rectangular pillar portion 12a and a projecting base portion 12b. A first vent hole 18A and a second vent hole 18B that are separated from each other by a certain distance are provided in an upper end 26 in the figure of the pillar portion 12a.

Two third base fabrics 20 (third base fabrics 20(1) and 20(2)) that are sewn to the first and second vent holes 18A and 18B, respectively, at one end, are provided in such a manner that they cover the pillar portion 12a and are arranged parallel to each other.

The present embodiment is used when vent holes cannot be provided in the transverse direction of the pillar portion 12a of the airbag 10.

In the fourth embodiment, the pillar portion 12a may have a single vent hole 18, for example, in the upper end 26 in the figure. Alternatively, the pillar portion 12a may have third and fourth vent holes 18C and 18D in a lower end 27. In such a case, a vent hole is certainly opened wherever the person pushes into the airbag 10. However, if a plurality of vent holes are opened simultaneously, pressure may be instantly released and bottoming of the airbag 10 may occur.

So, it is preferable to take a measure, such as increasing difference in binding force by sewing among the sewn portions 23, 24, 30, and 31, where the vent holes through which gas is discharged and the third base fabrics 20(1) and 20(2) are sewn together, increasing the internal tethers to slightly block discharge of gas, or the like.

Herein, in the airbag 10 according to each of the above-described embodiments, when a person pushes into the third base fabric 20 while the airbag 10 is in an inflated state, compared to a portion where inflation is restricted by the third base fabric 20, a portion adjoining thereto where inflation is not restricted is more largely inflated. Larger force acts on the third base fabric 20 near the boundary therebetween (herein, the ends of the each sewn portion of the third base fabric 20).

Figure 10:
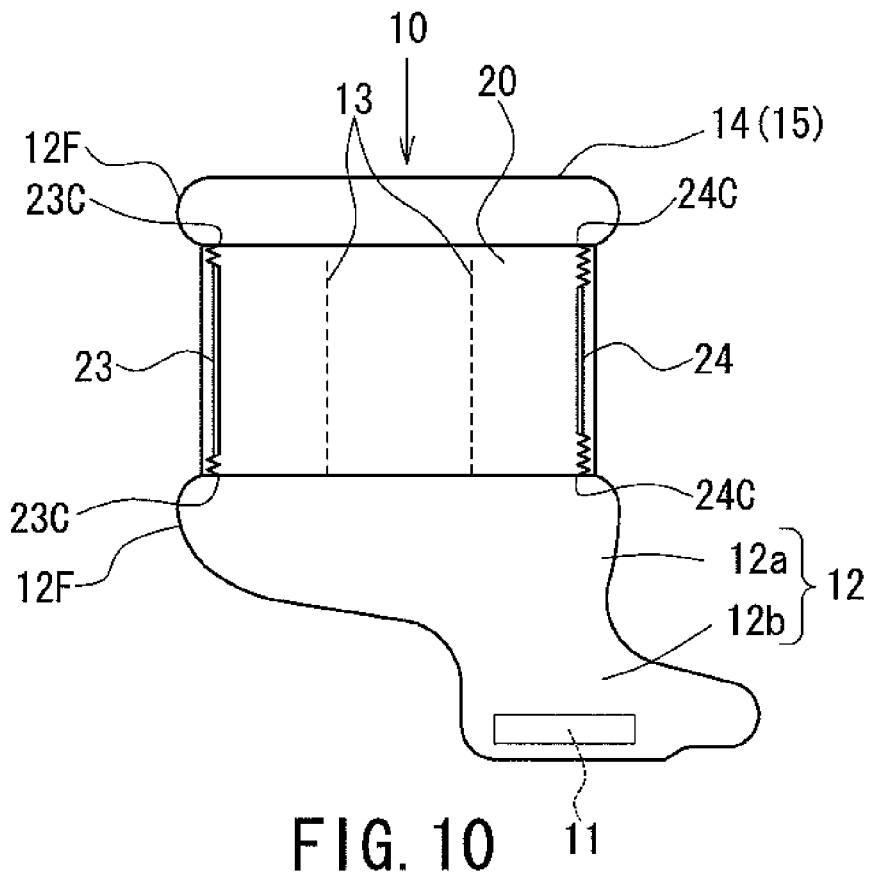
FIG. 10 is a schematic front view of an airbag of the airbag device of the present invention in an inflated and deployed state.

FIG. 10 is a schematic front view of the airbag 10 in such a state.

The airbag 10 is more easily inflated at upper and lower portions positioned above and below the third base fabric 20 than at the portion attached with the third base fabric 20. As shown in the figure, when a person pushes into the airbag 10 or when the airbag 10 is inflated before pushing, the airbag 10 swells outward of the third base fabric 20 (swelling portions 12F in the figure) while top and bottom ends 23C and 24C of the third base fabric 20 (the sewn portions 23 and 24) serve as the boundary. The swelling portions 12F are formed over the entirety of the front surface base fabric 14 of the airbag 10, along the top and bottom ends of the third base fabric 20. The swelling portions 12F swell in directions substantially perpendicular to the respective front surfaces of the front surface base fabric 14. For example, The swelling portions 12F swell outwardly in the width direction (rightward or leftward in the figure) of the airbag 10 at both side surface portions of the airbag 10, and swell outwardly in the thickness direction (frontward of the paper plane in the figure) of the airbag 10 at the front side surface portion of the airbag 10.

The ends 23C and 24C of the sewn portions 23 and 24, located near the boundary of the swelling portions 12F, receive great tension (breaking force) than the other portions, because of inflation force existing near the swelling portions 12F. As a result, when the inflated airbag 10 receives a person, the sewn portions 23 and 24 easily break from the ends 23C and 24C (herein, the end 23C of the sewn portion 23 whose binding force by sewing is smaller) to which the largest tension is applied. Thus, the boundary serves as a starting point where the sewn portion of the third base fabric 20 starts to break. This enables the sewn portion of the third base fabric 20 to be broken smoothly and stably, and the vent hole 18 to be certainly and quickly opened. Thus, a collided person can be safely protected.

Other than producing the swelling portions 12F utilizing the restricting force of the third base fabric 20, the airbag 10 may preliminarily be formed in such a shape that it easily produces the swelling portions 12F. More specifically, the portions outside the vicinity of the ends 23C and 24C, where inflation is not restricted, may be sewn in such a manner that they can be inflated more largely (refer to FIG. 10) than the portion attached with the third base fabric 20, where inflation is restricted. In this case, when the airbag 10 is in an inflated state, the swelling portions 12F are swelled (inflated) to some extent. Thus, when a person pushes into the airbag 10, the swelling portions 12F swell more largely, whereby tension applied to the ends 23C and 24C of the sewn portions 23 and 24 is further increased. If portions constituting the swelling portions 12F of the airbag 10 are made at positions inside (central portion side) the ends 23C and 24C of the sewn portions 23 and 24, tension applied to the ends 23C and 24C when a person pushes into is further increased. Accordingly, the boundary more effectively serves as the starting point where the sewn portion of the third base fabric 20 starts to break. In order to obtain the above-described advantages or the like, at least one of the ends of the sewn portions of the third base fabric 20 should be provided near the boundary between the portion where inflation is restricted by the third base fabric 20 of the airbag 10 when a person pushes into the third base fabric 20 of the airbag 10 in an inflated state and the portion adjoining thereto, where inflation is not restricted and where is inflated more largely (inflation portions 12F).

Next, an airbag device according to a fifth embodiment of the present invention will be described.

Figure 11:
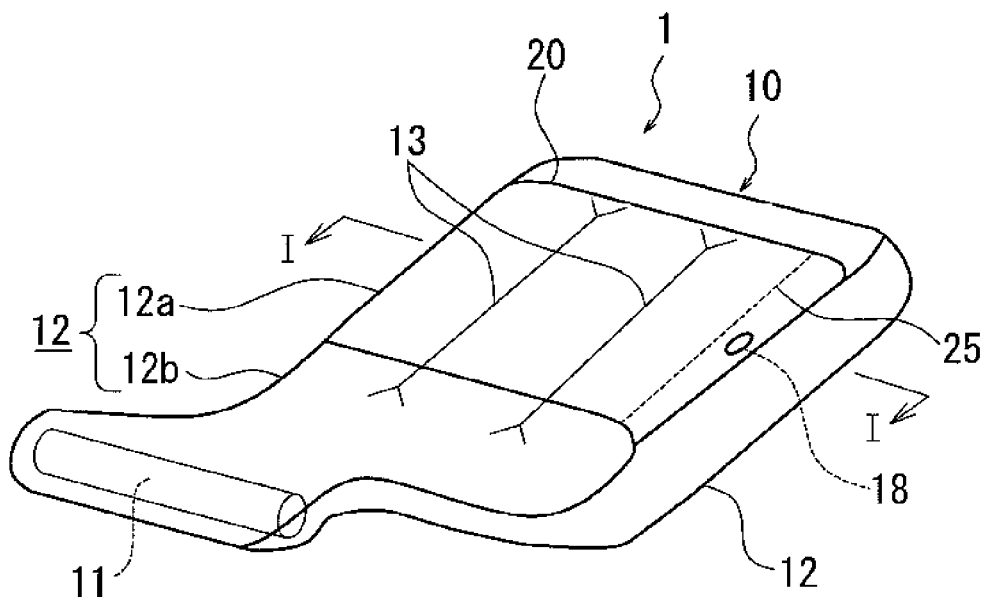
FIG. 11 is a perspective view of an airbag device according to a fifth embodiment in an inflated and deployed state.
Figure 12:
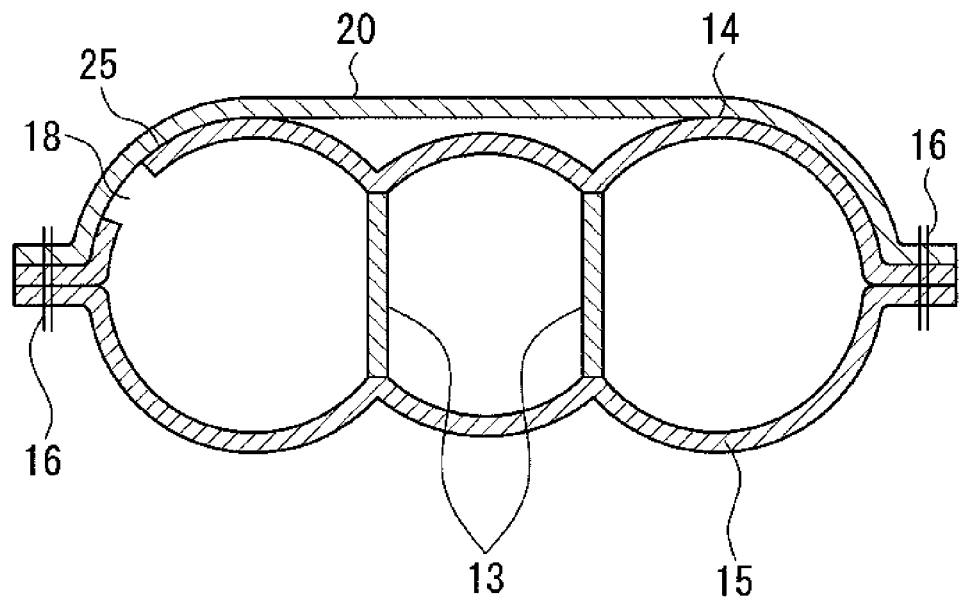
FIG. 12 is a sectional view taken along line I-I in FIG. 11.

FIG. 11 is a perspective view of the airbag device according to the fifth embodiment, in a deployed state, and FIG. 12 is a sectional view of FIG. 11, taken along line I-I.

The airbag device 1 according to the fifth embodiment has basically the same structure as the above-described airbag device according to the first embodiment. So, only portions different from those according to the first embodiment will be described below. The portions the same as those according to the first embodiment are denoted by like reference numerals.

As shown in FIG. 11 or FIG. 12, the airbag device 1 according to the fifth embodiment has the vent hole 18 in a portion near the sewn portion 16 located on one side end of the front surface base fabric 14. Accordingly, unlike the sewn portion 16 of the airbag body 12 according to the first embodiment, the sewn portion 16 of the airbag body 12 does not have an unsewn portion left between the sewn portions 16a (refer to FIG. 2), which serves as the vent hole 18. As shown in FIG. 12, the airbag body 12 is formed in a bag-like shape by sewing the front surface base fabric 14, with which a person collides, and the back surface base fabric 15 together at the sewn portion 16 along the outer peripheral portion.

On the other hand, as shown in FIG. 11, the rectangular third base fabric 20 is provided on the front surface of the front surface base fabric 14 of the airbag 10. The third base fabric 20 is narrower in width in the longitudinal direction than the rectangular pillar portion 12a when deployed, and is shorter in length in the transverse direction than the free length thereof. The third base fabric 20 is sewn to the front and back surface base fabrics 14 and 15 at both ends in the width direction in the figure, at the sewn portions 16.

The internal tethers 13 have such a length that they create a space between the front surface base fabric 14 and the third base fabric 20 during inflation of the airbag 10, and that they restrict the thickness during the inflation. The third base fabric 20 has such a length that, the tension (tensile force) caused by inflation of the airbag 10 is applied thereto. The third base fabric 20 is fixed to the front surface of the airbag 10.

The third base fabric 20 has a cutting line 25 at one side end thereof, near the vent hole 18 (herein, a portion near the inner side). The cutting line 25 may be of any structure, for example, a slit, intermittent cuts, perforations, or the like provided over the entire length, as long as it has weaker resistance to tension than the other portions of the third base fabric 20 and it is easily broken. The cutting line 25 may be provided, for example, outer side of the vent hole 18, as long as it is provided near the vent hole 18.

When the airbag 10 is in a folded state, the third base fabric 20 is not in close contact with the vent hole 18 provided in the airbag 10, and hence, the third base fabric 20 does not seal the vent hole 18. When, however, a vehicle collides with a pedestrian and the airbag 10 is inflated, the front surface of the airbag 10, where the vent hole 18 is provided, comes into contact with the third base fabric 20 because of the difference in the length between the front surface base fabric 14 and the third base fabric 20. Then, the front surface of the airbag 10 presses the back surface of the third base fabric 20 because of the internal pressure. Thus, the vent hole 18 and the third base fabric 20 are brought into close contact with each other, whereby the vent hole 18 is completely sealed.

In this state, for example, if the head of a person hits the third base fabric 20 of the airbag 10 and pushes (that is, pushes into) the airbag 10, the internal pressure of the airbag 10 is increased. Under great tension caused by an increase in the internal pressure of the airbag 10 and the inflation of the airbag 10, the third base fabric 20 is cut along the cutting line 25. When the third base fabric 20 is cut, the vent hole 18 is exposed and starts to discharge gas.

As shown in FIG. 12, the internal tethers 13 in the airbag 10 have a length slightly smaller than the width of the pillar portion 12a in the longitudinal direction, and are attached longitudinally at two positions, namely, left and right, of the pillar portion 12a.

The internal tethers 13 have a function to prevent the gas filled in the spaces between the internal tethers 13 from being rapidly discharged through the vent hole 18, when the vent hole 18 is opened.

Figure 13:
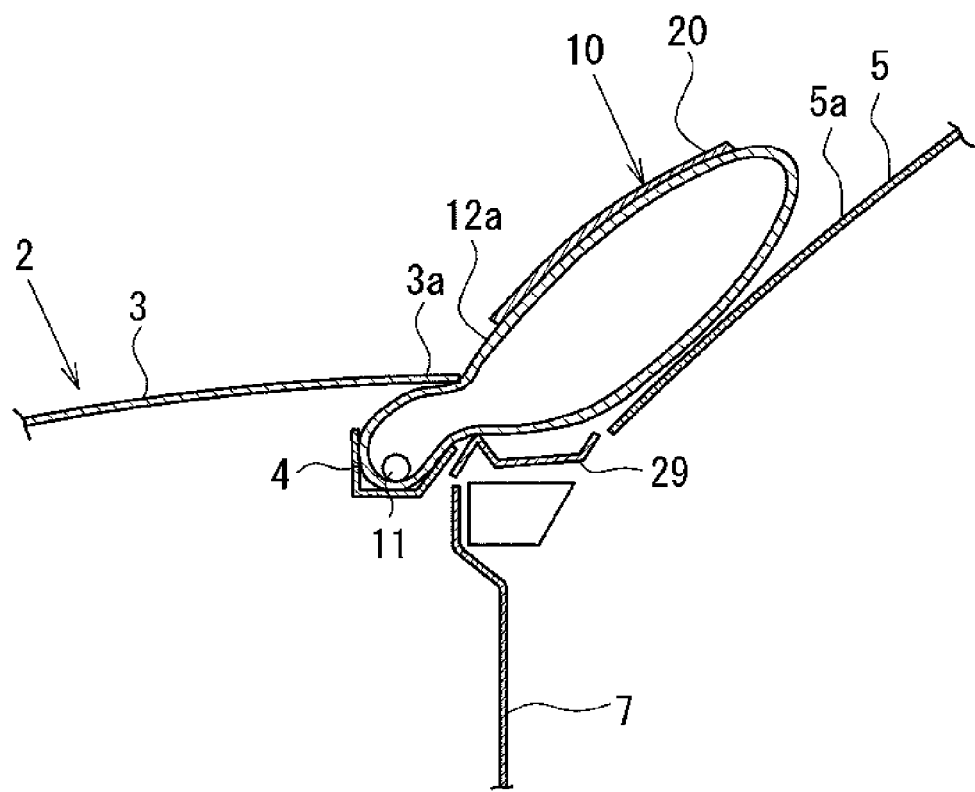
FIG. 13 is a side sectional view of the airbag device according to the fifth embodiment in an inflated and deployed state.
Figure 14:
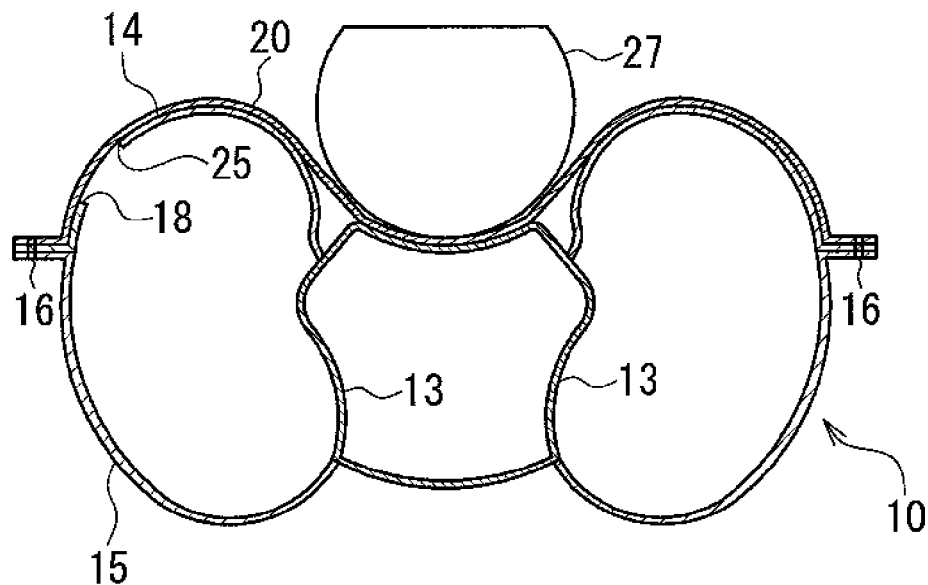
FIG. 14 is a sectional view corresponding to FIG. 12, during a collision with a human body.
Figure 15:
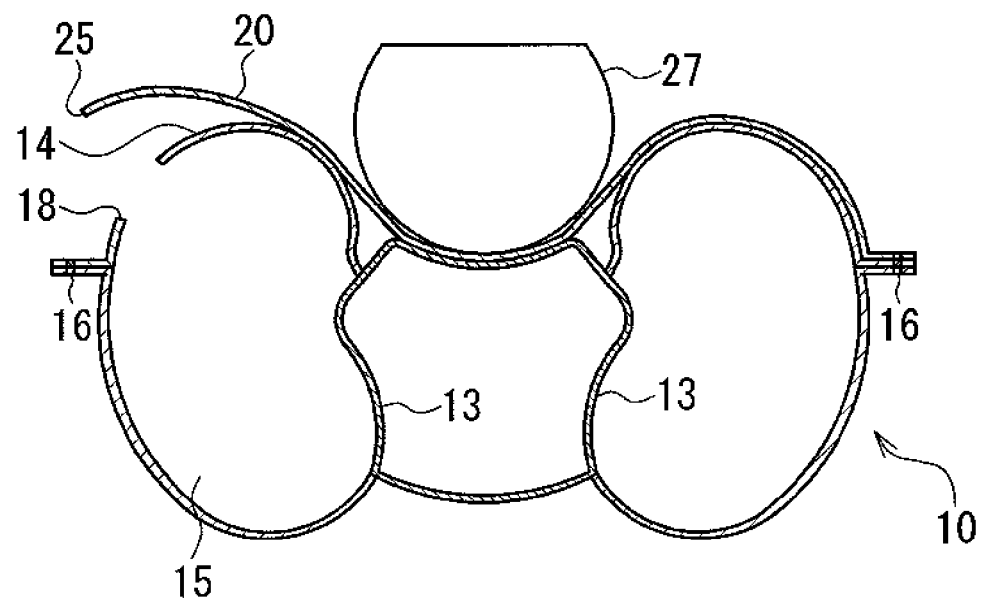
FIG. 15 is a sectional view during a collision with a human body, with a vent hole open.

Next, operation of the airbag device 1 according to the fifth embodiment, configured as above, will be described with reference to FIGS. 13 to 15.

When the running vehicle 2 collides with a pedestrian, a pedestrian-collision detection sensor (not shown) detects the collision. If the detected impact is larger than a predetermined value, an activation signal is output to the inflator 11 of the airbag device 1. The inflator 11, upon receipt of the activation signal, ejects gas and inflates the airbag 10. As the airbag 10 inflates, the rear portion of the bonnet 3a is pushed up. Then, as shown in the sectional view of FIG. 13, the airbag 10 stands up in the direction of the windshield 5, from the opening between the rear edge portion 3a of the bonnet 3 and the cowl panel 29 of the car body, and is deployed.

The person collided with the vehicle 2 and thrown onto the bonnet 3 hits, in the head, the pillar portion 12a of the airbag 10 inflated and deployed in front of the windshield 5a and the front pillar 6. More specifically, when the head 27 of the person collides with the pillar portion 12a of the airbag 10 through the third base fabric 20, the portion of the airbag 10 hit by the head 27 is pushed as shown in the sectional view of FIG. 14, and the internal pressure is increased. By making the length of the third base fabric 20 smaller than the length of the front surface base fabric 14 of the airbag 10, the airbag 10 during inflation is deformed because of the third base fabric 20. Great tension caused by the deformed airbag 10 being restored is applied to the third base fabric 20, and the third base fabric 20 is cut along the cutting line 25, as shown in FIG. 15. This allows gas to be released through the vent hole 18 and reduces excessive pressure caused by pushing of the head. Accordingly, the airbag 10 can receive the head with an adequate resilience.

As has been described, by setting the length of the third base fabric 20 shorter than that of the front surface base fabric 14, strong tension is applied to the third base fabric 20 during inflation and deployment of the airbag 10. Thus, when a person pushes into the airbag 10 through the third base fabric 20, the internal pressure of the airbag 10 is increased, and greater tension is applied to the third base fabric 20. Further, because a space is created between the third base fabric 20 and the front surface base fabric 14 of the airbag 10 during inflation and deployment of the airbag 10, greater tension is applied to the third base fabric 20 during pushing of a person (dummy). Accordingly, the third base fabric 20 can be stably broken.

However, in this structure, the third base fabric 20 is not cut during high-pressure deployment of the airbag 10. The cutting strength needs to be set in such a manner that the third base fabric 20 is cut during pushing of a person (dummy) even in a low-pressure state. However, providing such a structure is not always easy.

Figure 16:
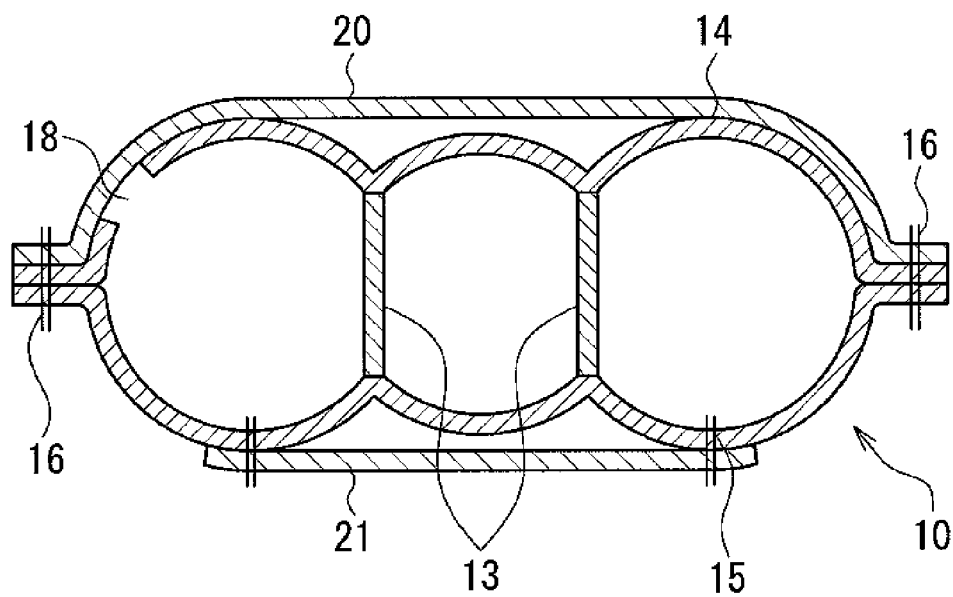
FIG. 16 is a sectional view of an airbag device having a third base fabric, according to a sixth embodiment.

So, in the airbag device according to the sixth embodiment, the section of which is shown in FIG. 16, the length of the third base fabric 20 is larger than that according to the fifth embodiment, so that the tension caused by inflation of the airbag 10 is not applied to the third base fabric 20.

More specifically, as shown in FIG. 16, it is configured such that tension is not applied to the third base fabric 20 even if the airbag 10 is inflated, and that the vent hole 18 is provided in a curved surface at the side portions of the airbag 10 in an inflated state, where the third base fabric 20 contacts the front surface base fabric 14 of the airbag 10 without a space therebetween, so that the vent hole 18 is closed (herein, the term "close" not only means "completely seal", but also means "practically seal", in which state bottoming does not occur when a person pushes into the airbag).

In the present embodiment, the belt length of the internal tethers 13 that restrict the thickness of the airbag 10 is shorter than the belt length of the internal tethers 13 according to the fifth embodiment so that the airbag 10 has larger concavities and convexities (the space between the third base fabric 20 and the airbag 10). In this case too, the length of the front surface base fabric 14 of the airbag 10 is larger than the length of the third base fabric 20. When a person (dummy) pushes into the third base fabric 20, tension is produced. When the tension reaches a predetermined value, the third base fabric 20 is broken and the vent hole 18 is opened.

In addition, a fourth base fabric 21 is provided on the back surface of the airbag 10, in such a manner that it extends along the surface thereof. Both ends of the fourth base fabric 21 are sewed to or adhered to proper positions including both ends of the back surface base fabric 15 of the airbag 10. This prevents the airbag 10 from being easily deformed and its back surface from opening outward (or sideward) when a person pushes into the front surface of the airbag 10, and prevents the airbag 10 from being bent in such a manner that it wraps the person pushed into the airbag 10 up.

Of course, the fourth base fabric 21 may be provided on the back surface of the airbag 10 according to the fifth embodiment.

Change or the like in acceleration G acting on a person (herein, a dummy's head) with respect to time t, when the collision load of the person is applied to the airbag 10, is already described in conjunction with FIG. 7.

Although the third base fabric 20 is cut when tension is applied thereto and the vent hole 18 is opened in the airbag 10 according to each of the above-described fifth and sixth embodiments, the present invention is not necessarily limited thereto. For example, both ends of the third base fabric 20 may be sewn to the front surface base fabric 14 and the back surface base fabric 15 (or the front surface base fabric 14) so that the vent hole 18 is closed during inflation of the airbag 10.

At that time, it may be configured such that the sewn end farther from the vent hole 18 has a stronger binding force by sewing than the sewn end closer to the vent hole 18. This allows only joining of the third base fabric 20 at the end closer to the vent hole 18 to be separated and the vent hole 18 to be opened, when a person pushes into the third base fabric 20 of the inflated airbag 10.

Figure 17:
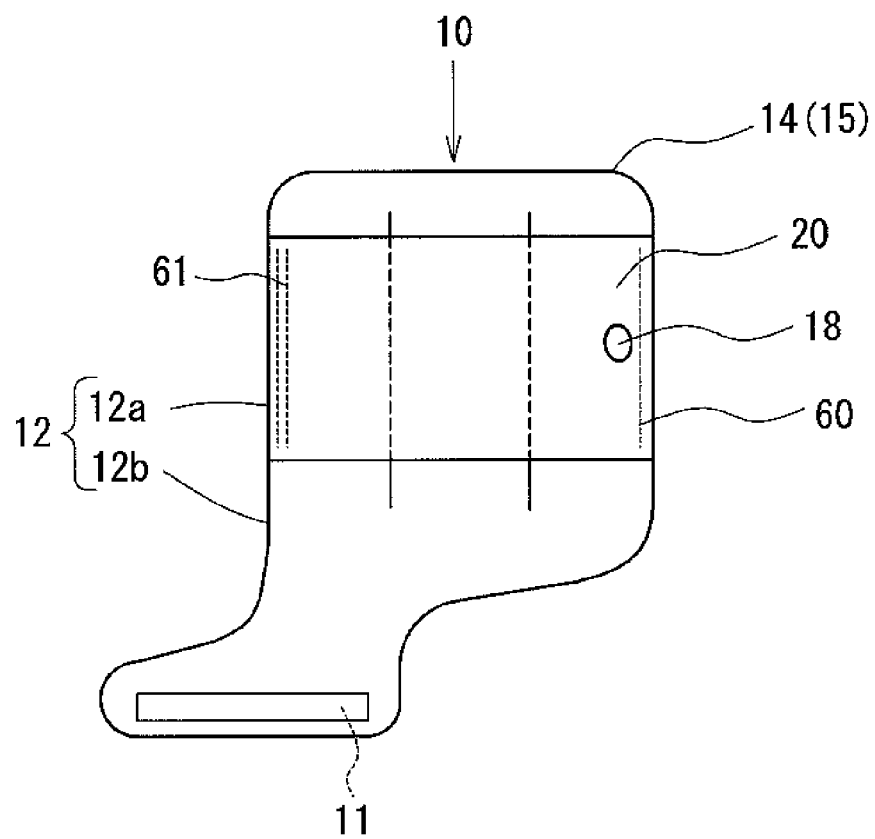
FIG. 17 is a front surface view of the airbag device according to the sixth embodiment of the present invention.

For example, as shown in FIG. 17, when both side ends of the third base fabric 20 are sewn to the front and back surface base fabrics 14 and 15, for example, the sewing length of a first sewn portion 60 is made shorter than that of a second sewn portion 61 to reduce the binding force by sewing. This allows the thread of the sewn portion 60 of the third base fabric 20 to be cut and released upon the impact of a person pushing into the airbag 10.

More specifically, during inflation of the airbag 10, for example, when the head of a person hits the third base fabric 20 of the airbag 10 and presses the airbag 10, and hence, great tension is applied to the sewn portions 60 and 61, the first sewn portion 60 is cut and the third base fabric 20 is removed. Then, the vent hole 18 is exposed.

The other structures are the same as those according to the above-described embodiments.

In the present embodiment, the base fabric 20 is not under tension until a person (dummy) pushes into the third base fabric 20, and thus, is not affected by the internal pressure of the airbag 10. Accordingly, the base fabric 20 has good robustness to temperature. (The amount of gas ejected varies according to the temperature, and the strength of the sewn portions 23 and 24 of the third base fabric 20 varies according to the temperature if the sewn portions 23 and 24 are made of resin. However, because the third base fabric 20 is not under tension, it is not affected by the temperature.)

Herein, in the airbag 10 according to each of the fifth and sixth embodiments, when a person pushes into the third base fabric 20 while the airbag 10 is in an inflated state, compared to a portion where inflation is restricted by the third base fabric 20, a portion adjoining thereto where inflation is not restricted is more largely inflated. Larger force acts on the third base fabric 20 near the boundary therebetween (herein, the ends of the third base fabric 20 in the top-bottom direction).

Figure 18:
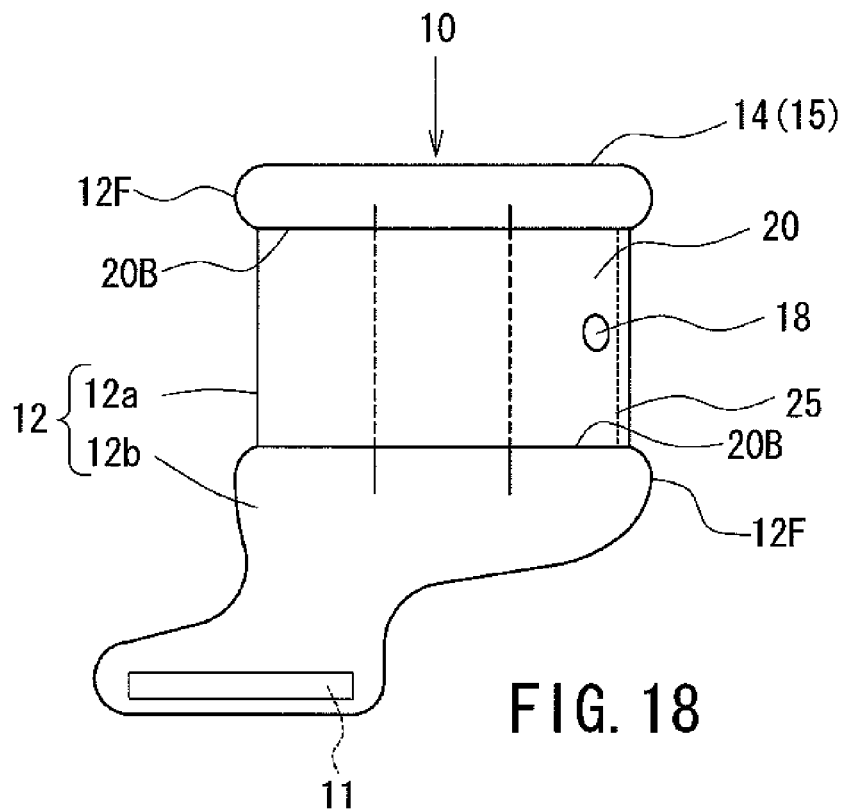
FIG. 18 is a schematic front view of an airbag of an airbag device of the present invention in an inflated and deployed state.

FIG. 18 is a schematic front view of the airbag 10 in such a state.

The airbag 10 is more easily inflated at upper and lower portions positioned above and below the third base fabric 20 than the portion attached with the third base fabric 20. As shown in the figure, when a person pushes into the airbag 10 or when the airbag 10 is inflated before pushing, the airbag 10 swells outward of the third base fabric 20 (swelling portions 12F in the figure) while top and bottom ends 20B of the third base fabric 20 serve as the boundary. The structure and the function of the swelling portions 12F are the same as those described in conjunction with FIG. 10.

Although the above-described airbag having the front surface base fabric 14 with the vent hole 18 has one vent hole 18, it is not limited thereto, and may have a second vent hole separated by a certain distance from the first vent hole 18. In such a structure, even if the body blocks one of the vent holes during pushing into the airbag, for example, the third base fabric 20 is cut or connecting portions are disengaged, and gas is released through the other vent hole. Thus, excessive gas pressure generated during pushing can be lowered to a safe level. If such a structure is employed, because both vent holes are opened during pushing into the airbag, it is desirable that a measure to prevent bottoming from occurring, such as providing many internal tethers or limiting the discharge capability of the vent holes, be taken.

As has been described, the airbag 10 according to each of the embodiments of the present invention starts to discharge gas through the vent hole 18 at the timing of a person colliding with the airbag 10. Thus, the pressure in the airbag 10 is high before colliding with a person, and the pressure is assuredly reduced after colliding with a person. Accordingly, the person is not damaged by colliding with the airbag 10, and the safety is high because a secondary collision can be prevented. In addition, because the structure is simple, i.e., basically, only adding the third base fabric 20 to the airbag 10, a reduction in the manufacturing cost is possible.

Figure 19:
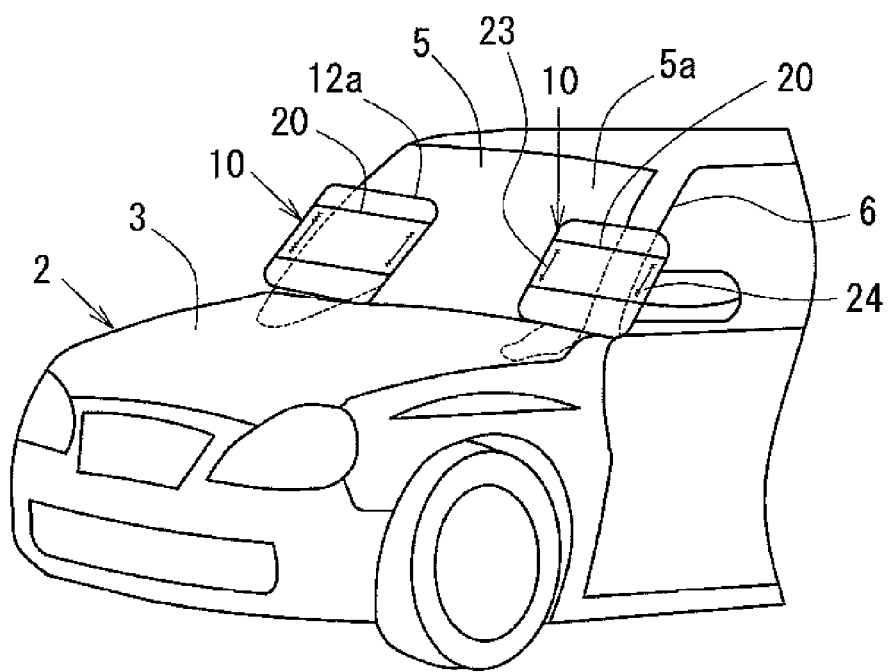
FIG. 19 is a perspective view of a vehicle with inflated airbags.

The airbag 10 according to each of the embodiments has been described to have such a structure in which the separately formed airbag 10 covers the front of the front pillars 6 on both side of the windshield 5 and the front of the windshield 5a adjacent thereto (refer to FIG. 19). However, the present invention is not limited to this form, and it may be applicable to a structure in which the pillar portion 12a has such a width that it covers the entirety of the windshield 5a, and one airbag device 1 is installed in the central portion of the bonnet 3.

Although the case where the airbag device is used to protect a pedestrian has been described, the present invention is not limited thereto, and it may be of course applicable to an airbag device used to protect an occupant of a vehicle.

What is claimed is:

1. An airbag device comprising:
    an airbag inflatable with gas generated by an inflator, the airbag having a front surface base fabric comprising a front surface of the airbag, a back surface base fabric comprising a back surface of the airbag, and internal tethers provided in an airbag body that restrict inflation; and
    a third base fabric that covers at least a portion of the front surface of the airbag and restricts inflation of the airbag during inflation,
    wherein the front surface base fabric of the airbag has a vent hole through which gas is discharged,
    wherein the third base fabric covers the vent hole, both side ends of the third base fabric being joined to the front surface base fabric,
    wherein the third base fabric is fixed to the front surface of the airbag and has such a length that the tension caused by inflation of the airbag is not applied thereto,
    wherein the third base fabric closes the vent hole through the use of a curved surface at the side portions of the front surface base fabric of the airbag during inflation, and
    wherein, while the airbag is in an inflated state, the third base fabric is broken and the vent hole is exposed so as to discharge gas, by the further inflation of the airbag resulting from an object pushing into the third base fabric.

2. The airbag device according to claim 1, wherein, when the third base fabric is broken at least one cut end is formed on the third base fabric, and said at least one cut end of the third base fabric is provided near a boundary between a portion where inflation is restricted by the third base fabric of the airbag when a person pushes into the third base fabric of the airbag in an inflated state, and a portion adjacent thereto where inflation is not restricted.

3. The airbag device according to claim 1,
    wherein the third base fabric has a cutting line near the vent hole, and
    wherein the third base fabric is broken along the cutting line and the vent hole is opened when an object pushes into the third base fabric of the airbag while the airbag is in an inflated state.

4. The airbag device according to claim 3,
    wherein the cutting line includes intermittent cuts.

5. An airbag device comprising:
    an airbag inflatable with gas generated by an inflator, the airbag having a front surface base fabric comprising a front surface of the airbag and a back surface base fabric comprising a back surface of the airbag; and
    a third base fabric that covers at least a portion of the front surface of the airbag and restricts inflation of the airbag during inflation,
    wherein the front surface base fabric of the airbag has a vent hole through which gas is discharged,
    wherein the third base fabric covers the vent hole, both side ends of the third base fabric being joined to the front surface base fabric, and
    wherein, while the airbag is in an inflated state, a joined portion at the joined side end portions of the third base fabric is separated and the vent hole is exposed so as to discharge gas, by the further inflation of the airbag resulting from an object pushing into the third base fabric.

6. The airbag device according to claim 5,
    wherein at least one end of the joined side portions of the third base fabric is provided near a boundary between a portion where inflation is restricted by the third base fabric of the airbag when an object pushes into the third base fabric of the airbag in an inflated state, and a portion adjacent thereto where inflation is not restricted.

7. The airbag device according to claim 5, further comprising internal tethers provided in an airbag body that restrict inflation of the airbag, and wherein the third base fabric is fixed to the front surface of the airbag and has such a length that the tension caused by inflation of the airbag is not applied to the third base fabric, and wherein, the third base fabric closes the vent hole through the use of a curved surface at the side portions of the front surface base fabric of the airbag during inflation.

* * * * *